US010742632B2

(12) United States Patent
Yefimov et al.

(10) Patent No.: US 10,742,632 B2
(45) Date of Patent: *Aug. 11, 2020

(54) PASSPORTING CREDENTIALS BETWEEN A MOBILE APP AND A WEB BROWSER

(71) Applicant: PAYPAL, INC., San Jose, CA (US)

(72) Inventors: Igor Yefimov, Mountain View, CA (US); Scott Atwood, Campbell, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/182,512

(22) Filed: Nov. 6, 2018

(65) Prior Publication Data

US 2019/0273730 A1    Sep. 5, 2019

Related U.S. Application Data

(63) Continuation of application No. 15/676,779, filed on Aug. 14, 2017, now Pat. No. 10,122,698, which is a continuation of application No. 15/256,204, filed on Sep. 2, 2016, now Pat. No. 9,736,141, which is a continuation of application No. 14/530,329, filed on Oct. 31, 2014, now Pat. No. 9,438,588, which is a continuation of application No. 13/162,842, filed on Jun. 17, 2011, now Pat. No. 8,881,250.

(51) Int. Cl.
*H04L 29/06* (2006.01)
*G06F 21/41* (2013.01)
*H04L 9/32* (2006.01)
*H04L 29/08* (2006.01)
*H04W 4/00* (2018.01)
*H04W 12/06* (2009.01)

(52) U.S. Cl.
CPC .............. *H04L 63/08* (2013.01); *G06F 21/41* (2013.01); *H04L 9/3234* (2013.01); *H04L 63/0807* (2013.01); *H04L 63/0815* (2013.01); *H04L 63/0853* (2013.01); *H04L 67/00* (2013.01); *H04L 67/02* (2013.01); *H04L 67/146* (2013.01); *H04L 67/42* (2013.01); *H04W 4/00* (2013.01); *H04W 12/06* (2013.01); *H04W 12/0602* (2019.01); *H04L 67/04* (2013.01)

(58) Field of Classification Search
None
See application file for complete search history.

(56) References Cited

U.S. PATENT DOCUMENTS

| 5,875,296 | A | 2/1999 | Shi et al. |
| 6,049,877 | A | 4/2000 | White |
| 6,308,212 | B1 * | 10/2001 | Besaw ................ G06F 9/451 709/228 |
| 7,143,025 | B2 | 11/2006 | Walsh et al. |

(Continued)

*Primary Examiner* — Kaveh Abrishamkar
(74) *Attorney, Agent, or Firm* — Haynes and Boone, LLP

(57) ABSTRACT

Systems and methods for passporting credentials provide a mechanism by which a native app on a client device can invoke a service provider's core web site web addresses (URL) while keeping the existing session active and shared between the two experiences (native app and web flow) so that the end user does not need to re-login at each context switch. The mechanism can include a unique way for the web flow context to communicate conditions and pass control back to the native app context of the shared session.

20 Claims, 3 Drawing Sheets

(56) References Cited

U.S. PATENT DOCUMENTS

| | | |
|---|---|---|
| 7,500,262 B1 | 3/2009 | Sanin et al. |
| 8,881,250 B2 * | 11/2014 | Yefimov ............... H04W 12/06 726/7 |
| 9,438,588 B2 * | 9/2016 | Yefimov ............... H04W 12/06 |
| 9,736,141 B2 * | 8/2017 | Yefimov ............... H04W 12/06 |
| 10,122,698 B2 * | 11/2018 | Yefimov ............... H04W 12/06 |
| 2004/0210771 A1 | 10/2004 | Wood et al. |
| 2004/0229595 A1 | 11/2004 | Laursen et al. |
| 2007/0101418 A1 | 5/2007 | Wood et al. |
| 2008/0046983 A1 | 2/2008 | Lester et al. |
| 2008/0256616 A1 * | 10/2008 | Guarraci ................ H04L 63/08 726/9 |
| 2010/0306547 A1 | 12/2010 | Fallows et al. |
| 2011/0105095 A1 | 5/2011 | Kedefors et al. |
| 2011/0159854 A1 | 6/2011 | Kedefors et al. |
| 2012/0151568 A1 | 6/2012 | Pieczul et al. |

\* cited by examiner

PASSPORTING CREDENTIALS BETWEEN A MOBILE APP AND A WEB BROWSER

CROSS REFERENCE TO RELATED APPLICATIONS

This application is a continuation of U.S. patent application Ser. No. 15/676,779, filed Aug. 14, 2017, which is a continuation of U.S. patent application Ser. No. 15/256,204, filed Sep. 2, 2016, now U.S. Pat. No. 9,736,141, issued on Aug. 15, 2017, which is a continuation of U.S. patent application Ser. No. 14/530,329, filed Oct. 31, 2014, now U.S. Pat. No. 9,438,588, issued on Sep. 6, 2016, which is a continuation of U.S. patent application Ser. No. 13/162,842, filed Jun. 17, 2011, now U.S. Pat. No. 8,881,250, issued on Nov. 4, 2014, which are hereby incorporated by reference in their entirety.

BACKGROUND

Technical Field

The present disclosure generally relates to providing secure communications for users of electronic devices running native apps and, more particularly, for facilitating authenticated communication sessions from a client device using both native applications and web browsers concurrently from the same device.

Related Art

Consumer mobile devices—such as smart phones, personal digital assistants, note pads, web-enabled pods, and players—and other devices—such as point of sale (POS) terminals and ticket kiosks—may provide functionality to the user of the device by executing application software, known as "apps". A "native" app—which may be downloadable or may come pre-packaged with hardware or an operating system, for example—is typically a software application specially designed to execute on a particular device, and there are many well-known apps for various particular mobile devices. Functionality may also be provided via what may be known as a "web app", which is not a piece of downloadable software, but actually a web site that is optimized for viewing, for example, on a particular mobile device, such as an iPhone®. For a software developer, creating a true native app (e.g., application programming interface (API)-based module) may take anywhere from 5 to 20 times more effort to implement and push to production than re-using an already built and available web-based functionality.

Both native apps and web apps may provide relative advantages, however, depending on the functionality desired to be obtained. For example, use of a native app may be better for situations in which the functionality of the app needs to take advantage of features built into a device, such as motion detection, voice recording, voice recognition, camera, and global positioning system (GPS). A native app may be better if it is desired for the content or service provided by the app to be available offline (e.g., in the absence of an Internet connection). On the other hand, use of a web app may be better for situations in which a web site and its content already exists and it is desired to provide the same content to many users, optimized for viewing by users of many different types of devices.

SUMMARY

According to one or more embodiments of the present invention, methods and systems for passporting credentials provide a mechanism by which a native app on a device can invoke a service provider's core web site web addresses (usually specified using a "uniform resource locator" or URL) while keeping the existing session active and shared between the two experiences (native app and web flow) so that the end user does not need to re-login at each context switch. The mechanism can include a unique way for the web flow context to communicate conditions and pass control back to the native app context of the shared session. Broadly, the mechanism provides the user authentication session ID to the embedded browser—also referred to as "web view control"—to access a web site's URL for a specific web command, view, or flow that requires the user's credentials to be used. The unique session identifier may be passed into the browser in place of the user's credentials to allow for the continuation of the authenticated session. The embedded browser is now the primary means of the user's interaction and this keeps the session current (e.g., not timed-out), allowing the user to continue using the web interface. Communication from the browser back to the native app may be accomplished by the native app monitoring URLs requested by the embedded browser, with requests for certain URLs indicating particular actions to be taken by the native app. Once the web portion of the flow is done the user returns to the native app, and the session keeps going in the native app context of the existing session. Embodiments may allow for better user experience as the users will not need to re-authenticate themselves when continuing the same session on the same device.

In one or more embodiments, a system includes: a client device executing a native app and an embedded web browser, in which the native app has a device session token that provides a session authentication with a server for a device session between the native app and the server, in which the session authentication is based on credentials for authenticating a user; and the native app invokes the embedded web browser, providing the embedded web browser with the device session token based on the credentials, in which the device session token provides authentication for the session on the embedded web browser.

In another embodiment, a computer-implemented method includes: authenticating a device session from a native app executing on a client device; producing a device session token from the authentication; passing the device session token to authenticate a user when entering a web flow; and entering the web flow on an embedded browser driven by the native app, in which a web flow session continues the device session based on the authentication provided from the device session token.

In a further embodiment, a computer program product comprises a non-transitory computer readable medium having computer readable and executable code for instructing a processor to perform a method that includes: authenticating a device session from a native app executing on a client device; producing a device session token from the authentication; passing the device session token to authenticate a user when entering a web flow; and entering the web flow on an embedded browser invoked by the native app, in which a web flow session continues the device session based on the authentication provided from the device session token.

DETAILED DESCRIPTION

Figure 1A:
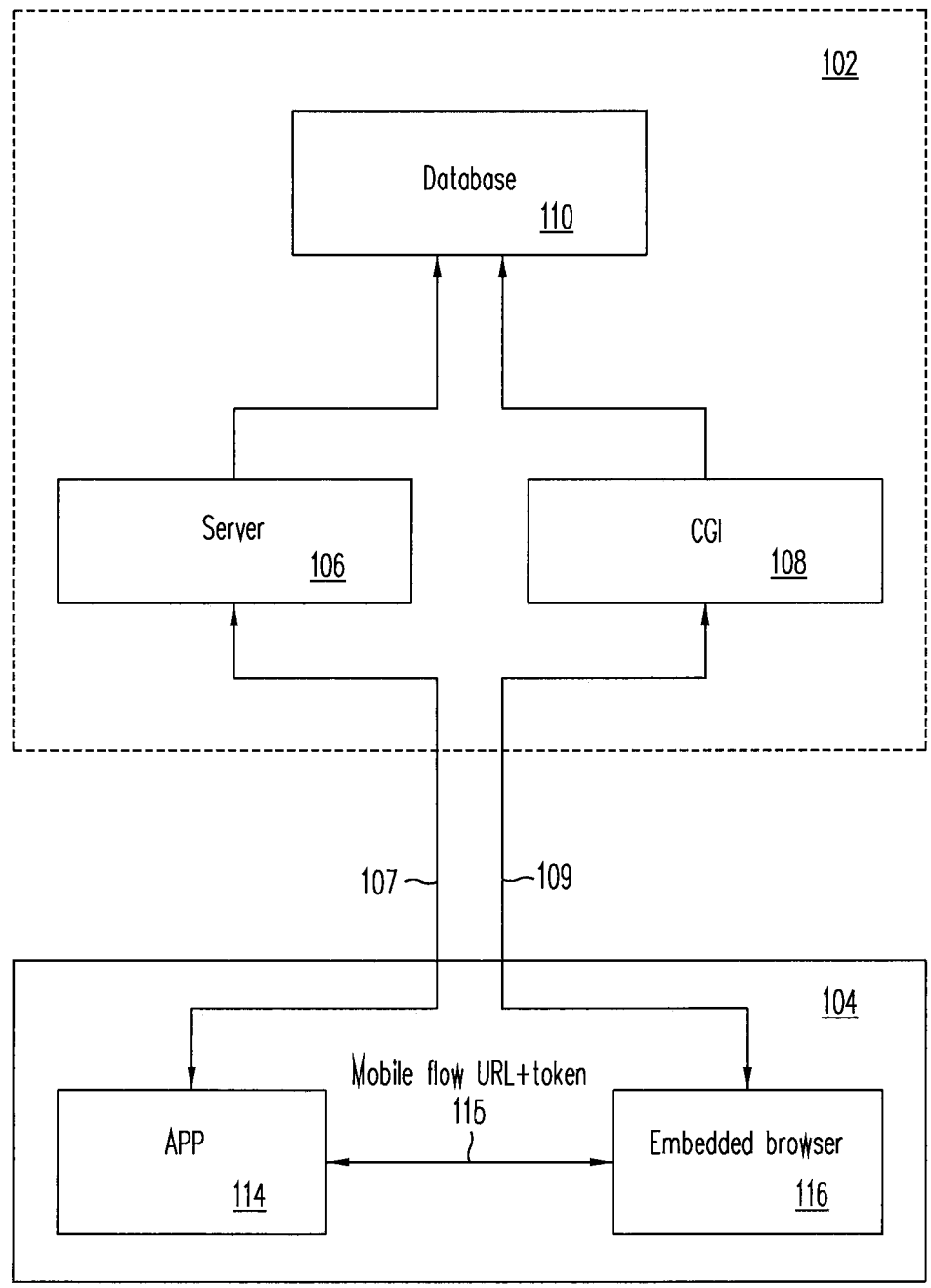
FIG. 1A is a system diagram illustrating communication between a client device and financial services provider (FSP) in accordance with one or more embodiments.

In accordance with embodiments of the present invention, passporting credentials is a mechanism by which a native app can invoke core web site uniform resource locators (or URLs) of an entity while keeping an existing user session active and keeping the session shared between the two user experiences (native app and web site) so that the user doesn't need to re-login at each context switch between native app and web site.

In some situations, it may be desirable to try to combine the advantages of both native apps and web apps by accessing a web site from within a native app. When authentication is needed, e.g., the user signs in to an account with a user identification (ID) and then provides a password to access the account, security may require that a separate, new authenticated session be started for the web app when the user enters the web app from the native app. A best practice for maintaining security is that the newly authenticated session in the web app may entail termination of the authenticated session in the native app to avoid running parallel authenticated sessions. Thus, when the user finishes with the web app portion of the functionality, the user may be required to log back in from within the native app to continue with the native app portion of the functionality. Such a user experience may be disruptive for the user and may effectively prevent or make impractical the use of many desirable and possible types of functionalities.

The entity providing a web site may be, for example, a financial service provider (FSP)—such as PayPal, Inc. of San Jose, Calif. —in which a consumer or vendor using the service may have an account with the FSP (referred to as an "FSP account"). The user may log in to the user's account by providing user credentials, such as a user name and password, that can be used to generate a user authentication session ID. The user authentication session ID may be provided to the embedded web browser (also referred to as "web view control") to access the entity's web site URL for a specific web command, view, or flow that requires the user's credentials to be used. The unique session identifier is passed into the browser in place of the user's credentials to allow for the continuation of the authenticated session between the native app and the browser. The browser may become the primary means of the user's interaction and the passported session identifier keeps the session current (not timed-out) allowing the user to continue utilizing the web interface. Once the web portion of the flow is done the user may return to native app and the session may keep going in the existing session context that exists in the native app.

Passporting credentials in accordance with one or more embodiments may allow for better user experience as users would not need to re-authenticate themselves when continuing the same session (from native app to embedded browser or vice versa) on the same device. For example, an authenticated session may be initiated when the user starts a native app and provides authentication credentials to an application programming interface (API) for authentication, and the authentication API returns a session token back to the native app. That session token is conventionally used as a mechanism by which the native app authenticates itself in all the subsequent API calls. That session token conventionally is refreshed with each and every API call made. If the user then launches a web site, the user would need to provide the same set of credentials, and a new session would be started for the web browser, which is separate from the session started on the app. (Conventionally, security concerns may then dictate terminating the native app session.) One embodiment may instead continue the previously started session and port its credentials into the web browser, allowing the user to seamlessly continue with the user interface (UI) flow without the need for the user to re-authenticate. Ideally, an average user would not notice a difference in experience when jumping from a native app UI into a web flow and back into the native app's UI.

By providing seamless transitioning to already built and available web-based functionality, one or more embodiments may allow an entity such as an FSP to provide their apps with a richer feature set for users much earlier than by the more usual means of creating a true native app API-based module, which may take anywhere from 5 to 20 times more effort to implement and push to production than re-using an already built and available web-based functionality. For example, the way native mobile apps are developed at one FSP may be heavily geared towards replicating functionality that exists on the FSP's main web site and "porting" it to the new app. As simple as it may seem on the surface, the process usually requires new APIs to be created to allow mobile app access to core FSP data and services. This approach generally provides no new functionality (albeit there's a new UI and a native app experience) and unnecessarily pollutes the API namespace with too many utility functions while accelerating the addition of those new APIs, thus further compounding the problem of the API set growing too fast and uncontrollably. The approach enabled by one or more embodiments may re-use the existing rich web functionality and allow seamless transitioning between native app's UI and the web site. A critical factor in this experience is that the user does not need to re-login when switching between the native app and the web site, which provides the desired non-disruptive user experience.

FIG. 1A illustrates a system 100 in which a user may communicate with an entity—such as an FSP—that maintains an infrastructure 102 for providing services and information. The user may communicate with the entity through its infrastructure 102 via a client device 104, which may be, for example, a consumer electronic mobile device such as a smart phone, notepad, point-of-sale (POS) terminal, kiosk, or any other of many familiar devices providing communications and access, for example, to the Internet or to an intranet or private communications network. For example, in the case of POS or kiosks the devices may provide a non-internet (intranet) connection to services. Although that may not be very common it may be needed as a security measure in closed systems. Many companies provide intranet-only services (such as payroll, human resources access, legal services, and proprietary documentation).

Client device 104 may include an application 114 (also referred to as "app") and a web browser 116 (which may be embedded in app 114) that execute on client device 104. Client device 104 may provide an ability to support HTTP protocol in a code which may be, for example, either running inside the application's memory space or in an external module that is directly controlled (driven) by the application, for example, in cases where the operating system (OS) or device or mobile device platform may support a type of cross-application control where the driven app is running outside the driver app's memory space. For example, app 114 may drive the execution of embedded browser 116 via execution flow 115 in which a "Mobile flow URL" and a "token" are two pieces of data sent into embedded web browser 116 so that embedded browser 116 knows: a) which URL to request; and b) what authentication data to provide. Execution flow 115 may be transparent (e.g., not noticeable) to the user and may include the passing of various forms of information back and forth between app 114 and embedded web browser 116, such as URLs and tokens, as shown in FIG. 1A.

The entity's (or FSP's, for example) infrastructure 102 may include a server 106, a common gateway interface (CGI) 108 serving web traffic, and a database 110. Server 106 may enable communication 107 between infrastructure 102 and application 114 (also referred to as "app") executing on client device 104. The expression "native app" generally may be used to describe that application 114 may be in some sense "optimized" to run on client device 104.

CGI 108 may be a process executing on a computer in the infrastructure 102 belonging to an entity such as an FSP. The CGI 108 may comprise binary code that is proprietary to the entity and may handle web page processing for the entity. CGI 108 may enable communication 109 between infrastructure 102 and embedded web browser 116 executing on client device 104. For example, when a user of client device 104 fills out a form on a web page and sends it in, it usually needs to be processed by an application program (residing in infrastructure 102, for example). A web server (which may be included in infrastructure 102) may pass the form information to the application program that processes the data and which may send back a response message. This method or convention for passing data back and forth between the web server and the (infrastructure) application may be provided by the CGI 108.

Both server 106 and CGI 108 may have access to and be in communication with database 110, as shown in FIG. 1A, and may provide information on and access to, for example, FSP accounts for users and vendors. Database 110 may be a conventional large-volume relational database system (RDBMS), for example, or a low latency, in-memory data storage system. Database 110 may provide a fast-response, low latency, in-memory database access for storing short-lived, non-persistent data, e.g., data that may be needed for only a few minutes to a few hours. Database 110, for example, may be characterized as a relational database in which a database row may provide access to a relatively large amount of associated information unlocked by a relatively small amount of information specifying a key to the row. A "token", e.g., a small data object, may be used, for example, to pass information from which such a key ultimately may be determined between various processes, such as server 106, CGI 108, application 114, and embedded browser 116. For example, FIG. 1 shows a token being passed between application 114 and embedded browser 116 in execution flow 115. From a security point of view, however, none of the components of device 104, e.g., app 114 or embedded browser 116, may be able to determine the key from the token passed in execution flow 115; only components of infrastructure 102, e.g., server 106, CGI 108, may have enough "knowledge" (e.g., crypto keys, algorithms) to be able to determine secure information from the token's internal structure.

Figure 1B:
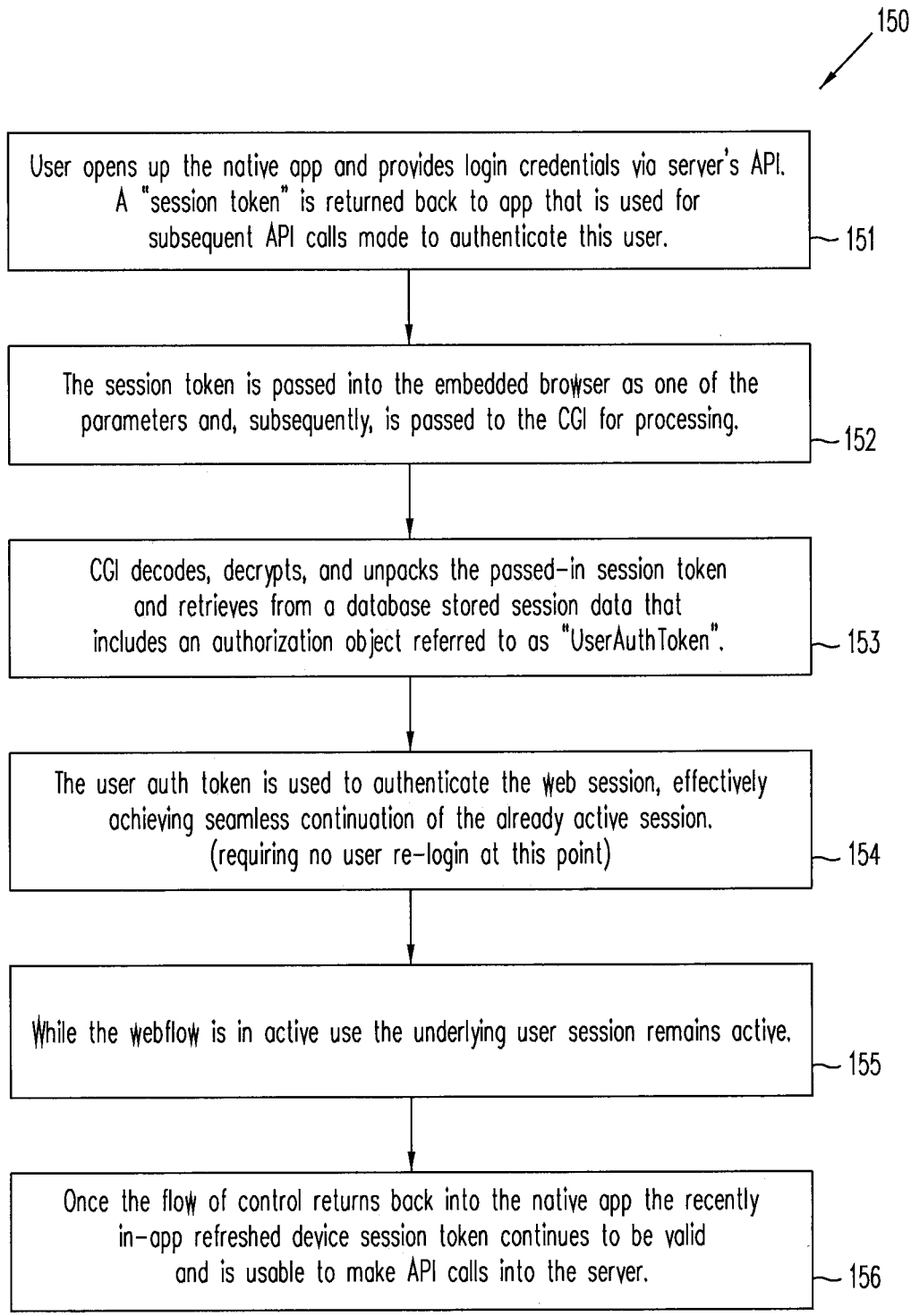
FIG. 1B is a flowchart illustrating a process performed by the system of FIG. 1A in accordance with one or more embodiments.

FIG. 1B illustrates a process 150 that may occur, according to one embodiment, in system 100 shown in FIG. 1A. At step 151, a user may open up the native app 114 and provide login credentials via an API of server 106. A device session token may be returned back to app 114, and the device session token may be used for each and every subsequent API call made to authenticate this user (with perhaps minor exceptions of APIs that don't require authentication). The device session token that is passed back may include, for example, a pointer to a record in database 110 that contains all the relevant information that pertains to this session (referred to as the stored session data). The device session token may be packed and encrypted, and then encoded, for example.

At step 152, the device session token may be passed into embedded browser 116 as one of the hypertext transfer protocol or secure hypertext transfer protocol (HTTP or HTTPS) GET parameters at execution flow 115 and, subsequently, may be passed to the infrastructure 102 into CGI 108 for processing.

At step 153, the CGI 108 may decode, decrypt, and unpack the passed-in session token and retrieve from database 110 the stored session data that includes, among other things, an authorization object referred to as a "UserAuthToken". Different user auth token objects may have different timestamps, permissions, and life cycles independently from each other and from the original device session token. Different user auth token objects may be related to one another in that multiple tokens can point to the same user or device session. In this regard, a device token and a web token may be two separate objects that may differ quite substantially yet share the same underlying user or device session. For example, one token may become invalid (expired) while the other token and the user session both remain valid.

At step 154, the UserAuthToken authorization object may be used to authenticate the web session on browser 116, effectively achieving a seamless continuation (e.g., requiring no user re-login at this point) of the already active session running from app 114. For example, the user auth token may be re-packaged (by CGI 108, for example) as a web token sharing the same underlying device session, as described above. In other words, the initial auth token (e.g., the passed-in session token) may be passed into the web flow where it can either be used directly as the web flow's auth token or the initial auth token may be re-packaged into a new auth token that is related to the initial auth token and can be used as the web flow's auth token so long as both tokens share the same underlying user or device session. The second token (e.g., the web token or web auth token) is not required to share the same characteristics as the first token (e.g., the device session token or user auth token) and may have different and independent access rights, lifespan, or other properties.

At step 155, while the web flow (e.g., the continued session from app 114 to embedded browser 116) is in active use (e.g., every new page request is done within the token expiration timeframe) the underlying user session (e.g., the session on app 114 or device session) remains active. For example, the native app 114 may keep refreshing its session token (the device session token, see step 151) by monitoring URL requests from the embedded web browser 116. Thus, if a user is currently logged in with the native app, the web flow session on the embedded browser continues the device session without requiring the user to re-login so that the user encounters a single shared session running at least two parallel secure communication interactions (e.g., communications 107, 109) with the infrastructure 102.

At step 156, once the flow of execution and user interaction returns back into native app 114, the recently refreshed (in app 114) device session token may continue to be valid (e.g., the token has not timed out in the web flow itself) and may be usable to make API calls into the server 106. For example, to ensure the app's device session token (of app 114) is current a call to an appropriate process (e.g., a process tracking the account balance of the user associated with the device session token) running on server 106 may be made every time the embedded browser 116 requests a new URL. Alternatively, a generic "keep-alive" technique may be used in which a call may be made to a low-cost or a specialized keep-alive API to keep refreshing the token.

Figure 2:
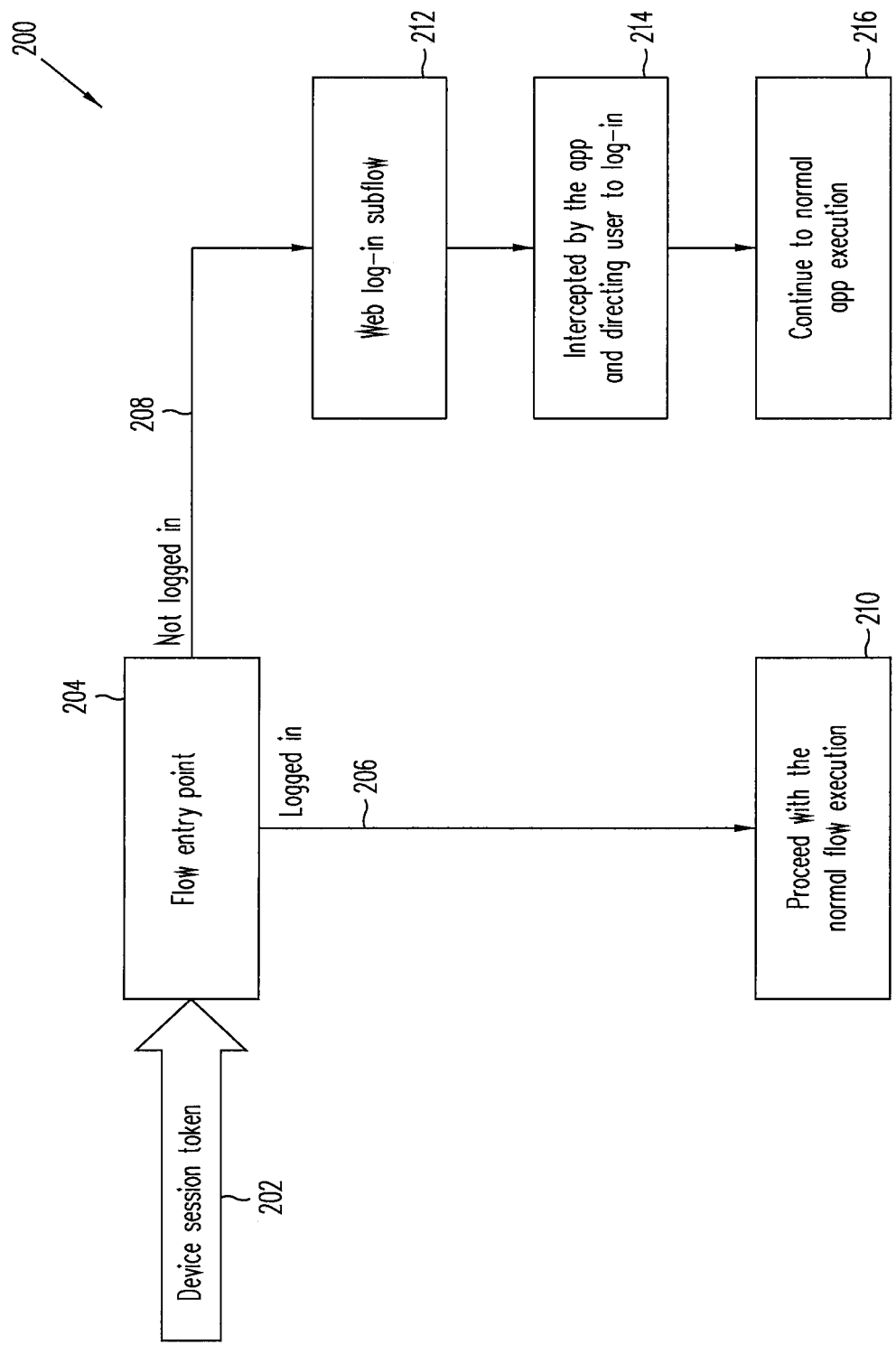
FIG. 2 is a flow diagram illustrating a process for entering a web flow between a native app and a web app in accordance with an embodiment.

FIG. 2 illustrates a process 200 for entering a web flow between a native app and a web browser—such as native app 114 and web browser 116 executing on client device 104—according to one embodiment. FIG. 2 illustrates, for example, how credentials may be passported from a native app authorization token into a web app session authorization token.

In general, when a user opens a web app, or an interactive web page from a browser, and performs some operations—such as transferring money between accounts with an FSP—the operations may be built in the form of a web flow. In other words, when the user moves from one operation to another, there is a flow of events and user interaction. The user may sometimes enter sub-flows; for example, when sending money from an FSP account, the user may find there is not enough in one account and may decide to add access to another bank account to fund the transaction (sending money). So then the user may enter a sub-flow for adding access to the bank account and then return to the web flow for sending money and continue with that same web flow. In computer parlance, the flows may be kept track of on a stack (e.g., a "navigation" stack), and when the user is finished with the adding-bank account sub-flow, that sub-flow is "popped" off the stack so that the user returns to the previous web flow.

Any entity—such as an FSP—providing a system 100 having an infrastructure 102 may provide a framework for its web flows in which each web page may include multiple pieces, e.g., states of a process that can be described using a state-transition diagram. A web flow framework may be executed, for example, by CGI 108. For example, there may be a state (or step of a process) for a user to enter a "send money" flow, a state that shows whether a user has someone in a contacts list, a state that shows this contacts list to select someone to send money to, and so forth. Likewise, there may also be subsets of states that correspond to various sub-flows. There may be many states or steps for each web page; some steps may be for displaying or changing the display on the web page, for example, and some steps may function, for example, to make a decision what to do next. Such a decision state may be provided by flow entry point step 204 of process 200 shown in FIG. 2.

At step 202, a native app (e.g., app 114) may invoke an embedded browser (e.g., embedded browser 116 running on client device 104 either inside the app's memory space or directly driven by the app) and provide a URL along with one parameter (e.g., the encrypted device session token) to the web flow entry point 204 (e.g., entry point for a web page or service provided by the entity, e.g., an FSP, of infrastructure 102). For example, the device session token may provide a CGI parameter that includes information for CGI 108 to find the correct flow entry point step 204 for a desired web flow to be continued from a point in the execution of app 114.

At step 204, labeled "flow entry point", a CGI (e.g., CGI 108) may decide whether the passed-in device session token is valid and whether the user's session appears to be still active or whether the session has expired. For example, the CGI may decode, decrypt, and unpack the passed-in device session token and retrieve from database 110 the stored session data that includes an authorization object, e.g., a user authorization token. Based on all the information, the web flow may recognize that the user is logged in and continue on branch 206. If not, the flow may continue on branch 208, as shown.

At branch 206, if the user is logged in (e.g., the native app session is still valid and not expired) the CGI (e.g., CGI 108) may re-package the authorization object (e.g., the user authorization token) to be used as an authorization session token for the web flow. For example, the CGI may extract credentials and other information from the authorization object and add other information—such as key information for accessing database 110 to find information associated with the current session—to re-package the authorization object as a web auth token. The re-packaged authorization object, for example, may be passed to web browser 116 via communication 109 shown in FIG. 1A. Continuing with branch 206, at step 210, the CGI may continue the execution of the flow (for example, on browser 116) as if the user is authenticated.

Branch 208—user not logged in—may be taken, for example, if there is a fatal error, such as the device session token passed at step 202 was for any reason not good enough—e.g., garbled, bogus, empty, or the session had expired—to be able to proceed. At branch 208, if the user is not logged in, then the web flow may begin to dispatch the user into a web login sub-flow, at step 212.

At step 214, the native app (e.g., app 114) that's driving the execution of the embedded browser 116 may intercept the URL (e.g., the URL passed at execution flow 115) and instead navigate the user into an in-app (e.g., in application 114) login dialog, leaving the embedded browser frame. Once logged in (for example, via the native app's 114 dialog) the user may have an option to re-enter the same web flow. Alternatively, the driver app 114 may be smarter (e.g., include additional logic) and first make sure either that the device session token has indeed expired (and then direct the user into a login screen) or that an unrecoverable fatal error has occurred (and then, for example, display an appropriate message to the user, e.g., "try again later").

Once the application 114 has invoked the web browser 116, however, communication in the direction from web browser 116 to application 114 may be limited. In other words, there may be no direct way for the web flow to signal back to a native app that an error has occurred because the web flow may be completely ignorant of whether or not it has even been invoked by an app. For example, if there is a fatal error in processing a user's request in a web flow—for example, the database is down—the application 114 would not know that the embedded web page failed to render because the web flow will render something (one way or another), and the application 114 will not have capability to check the text of what was rendered to make sure the text was correct (because, for example, the text may vary every time). So, in one or more embodiments, communication back to the driver application (e.g., the application 114 that invoked embedded browser 116) may be implemented by the driver application 114 monitoring the URLs being requested by the browser 116. For example, an embedded web flow may signal events, such as an error condition or exit from the web flow, by requesting pre-defined URLs that are being watched by the driver application. Once one or more of these special, pre-defined URLs is requested, the driver application may intercept the pre-defined special URL and act accordingly.

There are generally two types of errors: system errors that are fatal (non-recoverable) and user errors (recoverable). The web flow should handle the user (recoverable) errors gracefully without help from the driver application.

In case of an unrecoverable fatal error (e.g., internal error or system error) the web flow should redirect the user into the device login URL to signal the driver application 114 that the web flow has encountered an unrecoverable error and must be closed. The user should be able to navigate into the web flow anew, as if it is the first time the flow is being entered, as described below, at step 216.

The rationale behind choosing a login URL for this fatal error condition is as follows: in case there's a (separate) bug in the driver app and the URL interception fails, there is at least a device-specific-skinned web page that takes the device's capabilities (e.g., screen resolution) into account that is being presented to the user. For example, on client device 104 a web page optimized for a mobile device may be presented if client device 104 is a mobile device). For another example, if client device 104 is a voice terminal for blind people, an "audio page" may be the device-specific presentation—which might otherwise have been just a regular block of text—of the information presented to the user on client device 104.

Also in case of tampering with the calling parameters or evidence of corrupted data being sent to the server, it is a standard security measure to send the user back to the login step if the authenticity cannot be verified.

For exit from the web flow, a URL may be registered for an embedded web flow to use that can be recognized by the driver application as an "exit" signal. Once the web flow requests that URL, the driver application may close the embedded web browser, moving the user "back" in the driver application's navigation stack.

Once logged in (via the native app's dialog) the user may, at step 216, have an option to re-enter the same web flow (for example, by passing the same URL and a valid device session token to browser 116 at step 202).

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as processing component (e.g., processor, micro-controller, digital signal processor (DSP), etc.), system memory component (e.g., RAM), static storage component (e.g., ROM), disk drive component (e.g., magnetic or optical), network interface component (e.g., modem or Ethernet card), display component (e.g., CRT or LCD), input component (e.g., keyboard or keypad), and/or cursor control component (e.g., mouse or trackball). In one embodiment, disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Logic may be encoded in a computer readable and executable medium, which may refer to any medium that participates in providing instructions to the processor for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted.

In various embodiments, execution of instruction sequences for practicing the invention may be performed by a computer system. In various other embodiments, a plurality of computer systems coupled by communication link (e.g., LAN, WLAN, PTSN, or various other wired or wireless networks) may perform instruction sequences to practice the invention in coordination with one another.

Computer system may transmit and receive messages, data, information and instructions, including one or more programs (i.e., application code) through communication link and communication interface. Received program code may be executed by processor as received and/or stored in disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A system comprising:
    a non-transitory memory; and
    one or more hardware processors coupled to the non-transitory memory and configured to read instructions from the non-transitory memory to cause the system to perform operations comprising:
        receiving, from a native application on a user device, a transaction request for performing a transaction for a user, wherein the transaction request comprises authentication credentials associated with the user for logging in to a user account with a service provider;
        initiating a process workflow associated with the transaction for the user account based on the transaction request, wherein the process workflow requires interactions with the user via an application interface provided by the native application and a web interface provided by a web browser of the user device;
        generating a session token for tracking a progress of the process workflow associated with the user account;
        transmitting the session token to the native application on the user device;
        determining the progress of the process workflow associated with the user account based on user interactions with the user via the application interface of the native application on the user device using the session token;
        receiving, from a web browser of the user device, a web request to continue the process workflow for the user account;
        determining that the web request comprises the session token;
        in response to determining that the web request comprises the session token, presenting data on the web interface of the web browser on the user device to continue the process workflow associated with the user account based on the determined progress of the process workflow without requiring the user to provide the authentication credentials through the web browser, wherein the data presented on the web interface is obtained based at least in part on the user interactions with the user via the application interface.

2. The system of claim 1, wherein the operations further comprise:
    generating session data based on the user interactions with the application interface, wherein the data is obtained based on at least a portion of the session data.

3. The system of claim 1, wherein the operations further comprise:
    updating the progress of the process workflow based on user interactions with the user via the web interface;
    receiving, from the native application on the user device, an indication for resuming the process workflow via the application interface; and
    providing, on the application interface of the native application on the user device, second data based on the updated progress of the process workflow.

4. The system of claim 3, wherein the session token is associated with an expiration time, and wherein the operations further comprise:
    determining that the indication is received prior to the expiration time, wherein the second data is provided on the application interface in response to determining that the indication was received prior to the expiration time.

5. The system of claim 1, wherein the session token is associated with an expiration time, and wherein the operations further comprise:
    receiving, from the web browser on the user device, a second web request associated with the process workflow; and
    in response to receiving the second web request, extending the expiration time associated with the session token.

6. The system of claim 1, wherein the operations further comprise:
    determining a first access policy for accessing resources associated with the user account via the native application of the user device; and
    determining a second access policy for accessing the resources associated with the user account via the web browser of the user device, wherein the second set of access rights is different from the first set of access rights.

7. The system of claim 1, wherein the web browser is embedded within the native application.

8. The system of claim 1, wherein the authentication credentials are received by an application server of the system, and wherein the web request is received by a Common Gateway Interface (CGI) of the system.

9. A method comprising:
    receiving, by an application server associated with a service provider and from a native application on a user device, a transaction request for performing a transaction for a user, wherein the transaction request comprises authentication credentials associated with the user for logging in to a user account with the service provider;
    initiating a process workflow associated with the transaction for the user account based on the transaction request, wherein the process workflow requires interactions with the user via an application interface provided by the native application and a web interface provided by a web browser of the user device;
    generating, by the application server, a session token for tracking a progress of the process workflow associated with the user account;
    transmitting, by the application server, the session token to the native application on the user device;
    determining the progress of the process workflow associated with the user account based on user interactions with the user via the application interface of the native application on the user device using the session token;
    generating, by the application server, session data based on the user interactions;
    receiving, by a web server associated with the service provider and from the web browser on the user device, a web request to continue the process workflow for the user account;
    determining, by the web server, that the web request comprises the session token; and in response to determining that the web request comprises the session token, presenting, by the web server on the web interface of the web browser, data based on the determined progress of the process workflow and at least a portion of the session data.

10. The method of claim 9, wherein the data comprises a webpage of the service provider.

11. The method of claim 10, further comprising:
detecting, by the web server, an interaction with the webpage presented on the web browser on the user device; and
refreshing the session token based on the detected interaction.

12. The method of claim 10, wherein the webpage is associated with a sub-flow of the process workflow for performing the transaction for the user account.

13. The method of claim 9, further comprising:
subsequent to presenting the data on the web interface of the web browser, receiving, by the application server, an application programming interface (API) call from the native application of the user device; and
resuming the process workflow via the application interface of the native application based on the API call.

14. The method of claim 13, further comprising updating the progress of the process workflow based on user interactions with the user via the web interface of the web browser, wherein the resuming the process workflow is based on the updated progress.

15. A non-transitory machine-readable medium having stored thereon machine-readable instructions executable to cause a machine to perform operations comprising:
receiving, from a native application of a user device, a transaction request for performing a transaction for a user, wherein the transaction request comprises authentication credentials;
verifying the authentication credentials to grant access to a user account with a service provider;
initiating a process workflow associated with the transaction for the user account based on the transaction request, wherein the process workflow requires interactions with the user via an application interface provided by the native application and a web interface provided by a web browser of the user device;
generating a session token for tracking a progress of the process workflow associated with the user account;
transmitting the session token to the native application of the user device;
determining the progress of the process workflow associated with the user account based on user interactions with the user via the application interface of the native application on the user device using the session token;
receiving, from the web browser of the user device, a web request to continue the process workflow for the user account;
determining that the web request comprises the session token; and
in response to determining that the web request comprises the session token, presenting data on the web interface of the web browser to continue the process workflow associated with the user account based on the determined progress of the process workflow, wherein the data is obtained based at least in part on the user interactions with the user via the application interface.

16. The non-transitory machine-readable medium of claim 15, wherein the operations further comprise generating session data based on the user interactions with the user via the application interface, wherein the data presented on the web interface is obtained based on at least a portion of session data.

17. The non-transitory machine-readable medium of claim 15, wherein the operations further comprise:
updating the progress of the process workflow based on user interactions with the user via the web interface;
receiving, from the native application of the user device, an indication for resuming the device session; and
providing, on the application interface of the native application, second data based on the updated progress of the process workflow.

18. The non-transitory machine-readable medium of claim 17, wherein the session token is associated with an expiration time, and wherein the operations further comprise:
determining that the indication is received prior to the expiration time, wherein the second data is provided on the application interface in response to determining that the indication was received prior to the expiration time.

19. The non-transitory machine-readable medium of claim 15, wherein the session token is associated with an expiration time, wherein the data presented on the web interface comprises a webpage, and wherein the operations further comprise:
detecting an interaction of the user with the webpage; and
in response to detecting the interaction with the webpage, extending the expiration time associated with the session token.

20. The non-transitory machine-readable medium of claim 15, wherein the operations further comprise:
determining a first access policy for accessing resources associated with the user account via the native application of the user device; and
determining a second access policy for accessing the resources associated with the user account via the web browser of the user device, wherein the second set of access rights is different from the first set of access rights.

* * * * *